United States Patent [19]

Binsbergen et al.

[11] Patent Number: 5,587,438
[45] Date of Patent: Dec. 24, 1996

[54] PROCESS FOR PREPARING STYRENE POLYMERS

[75] Inventors: Frederik L. Binsbergen; Alouisius N. R. Bos; Augustinus Santen, all of Amsterdam, Netherlands

[73] Assignee: Shell Oil Company, Houston, Tex.

[21] Appl. No.: 455,371

[22] Filed: May 31, 1995

[51] Int. Cl.$^6$ .................................. C08F 2/02; C08F 12/08
[52] U.S. Cl. ........................... 526/88; 526/347; 526/347.2
[58] Field of Search ......................... 526/347.2, 88, 526/347

[56] References Cited

U.S. PATENT DOCUMENTS

| | | | |
|---|---|---|---|
| 3,325,386 | 6/1967 | Jurschewitz | 366/108 |
| 3,325,455 | 6/1967 | Warner | 528/323 |
| 3,350,377 | 10/1967 | Norwood | 526/70 |
| 3,644,305 | 2/1972 | Frisque et al. | 526/88 |
| 4,032,701 | 6/1977 | Hughes | 526/88 |
| 4,647,650 | 3/1987 | Sasaki et al. | 528/274 |
| 5,391,655 | 2/1995 | Brandstetter et al. | 526/347.2 |

FOREIGN PATENT DOCUMENTS

| | | |
|---|---|---|
| 2043663 | 3/1970 | European Pat. Off. |
| 0374807 | 12/1989 | European Pat. Off. |

*Primary Examiner*—Thomas R. Weber
*Attorney, Agent, or Firm*—Keith M. Tackett

[57] ABSTRACT

The invention relates to a process for preparing polymers by bulk polymerizing a monomer feedstock composed of styrene or styrene-like monomers and/or anionically copolymerizable comonomers employing an anionic initiator and a conventional spray-tower as reactor in the absence of a quenching solvent that fills the lower portion of the spray-tower, and the polymers so produced.

17 Claims, 1 Drawing Sheet

PROCESS FOR PREPARING STYRENE POLYMERS

FIELD OF THE INVENTION

The invention relates to a process for preparing styrene polymers (i.e., polystyrene and copolymers of styrene and/or vinylarenes with copolymerizable comonomers), and the polymers so produced.

BACKGROUND OF THE INVENTION

Ionic bulk polymerization of styrene is not widespread. Typically, styrene polymers are prepared by thermal or radical-initiated (batch or continuous) bulk polymerization; solution polymerization; emulsion polymerization; or suspension polymerization.

The bulk polymerization in a spray-tower of conjugated diolefins for the production of rubbers and of thermoplastic polymers is known from U.S. Pat. No. 3,350,377. The patent discloses the anionic polymerization of, e.g., 1,3-butadiene, optionally with other polymerizable monomeric materials such as, among others, styrene and methylstyrene. Additionally, the patent mentions the Ziegler-Natta catalysed polymerization of 1-olefins (propylene, butylene, isobutylene, styrene, methylstyrene, etc.). This process comprises: (a) maintaining the monomeric liquid material at a first temperature at which polymerization will not occur; (b) admixing a suitable polymerization catalyst (such as butyllithium in the case of (co)polymerizing conjugated diolefins and Ziegler-Natta catalysts in case of 1-olefins) with said monomeric material at said first temperature; (c) spraying the resulting admixture downwards in the upper portion of a polymerization zone; (d) passing the vapor from a volatile hydrocarbon quench liquid heated to a second temperature at least above the polymerization initiation temperature of said admixture upwardly in said polymerization zone, thereby heating the downwards flowing spray of said admixture, and thus initiating polymerization; (e) permitting the polymer to quench and settle in the lower portion of said polymerization zone containing the relatively cooler quench liquid thereby vaporizing at least a portion of said quench liquid to produce said vapors that pass upwardly in said polymerization zone; and (f) withdrawing polymer solids from said lower portion.

The disadvantage of this process concerns the removal of the quenching solvent, that is essential to initiate the polymerization and prevent run-away reactions, from the polymerized droplets in a subsequent drying zone. Moreover, the organometal compounds mentioned as (part of the) catalyst for polymerizing the 1-olefins are simply too hazardous to handle in such process (note that at the reaction conditions the alkylaluminium compounds are relatively volatile and extremely air and moisture sensitive). Finally, the patent specification merely mentions the possibility of polymerizing 1-olefins, without any reference to the molecular weight of the so produced thermoplastic polymer or its residual monomer content. This is not entirely surprising as the patent is primarily concerned with the production of rubbers whereas the remaining monomers are anyway removed in the drying zone.

U.S. Pat. No. 3,644,305 discloses a process that is coined "spray-polymerization". It is similar to the process in U.S. Pat. No. 3,350,377, however, concerning radical-initiated, solution polymerization of vinyl monomers, in particular water-soluble, ethylenically-unsaturated monomers. The disadvantages of this process, if applied in respect of the production of styrene polymers, concern the presence of the solvent and the lesser stability of the radical polymerized polymer. Moreover, according to the patent specification, the time of contact is relatively short and therefore spray polymerization provides only relatively low molecular weight polymers.

The inventors set out to develop a process for anionically preparing styrene polymers, as anion-initiated polymerization more readily allows the production of copolymers, and provides more stable polymers (avoiding or at least reducing the need for light stabilizers). The ideal process should moreover be able to afford a wide range of different grades, produced in high yield and preferably in continuous mode at low fixed and variable costs. The process should also be highly flexible, avoiding the production of twilight materials. Naturally, problems associated with residual styrene monomer or viscosity of the styrene polymer should be evaded.

SUMMARY OF THE INVENTION

The inventors surprisingly arrived at the present process whereby styrene polymers of sufficient molecular weight can be prepared by anion-initiated bulk polymerization in a spray-tower without risk of detrimental run-away reactions and thus without requiring the presence of a quench liquid in the lower portion of the spray-tower. The anionic initiator is conveniently admixed with the monomer feedstock prior to the same being sprayed into the spray-tower. Accordingly, the anionic initiator is preferably soluble in the monomer feedstock.

DETAILED DESCRIPTION OF THE DRAWINGS

Figure 1:
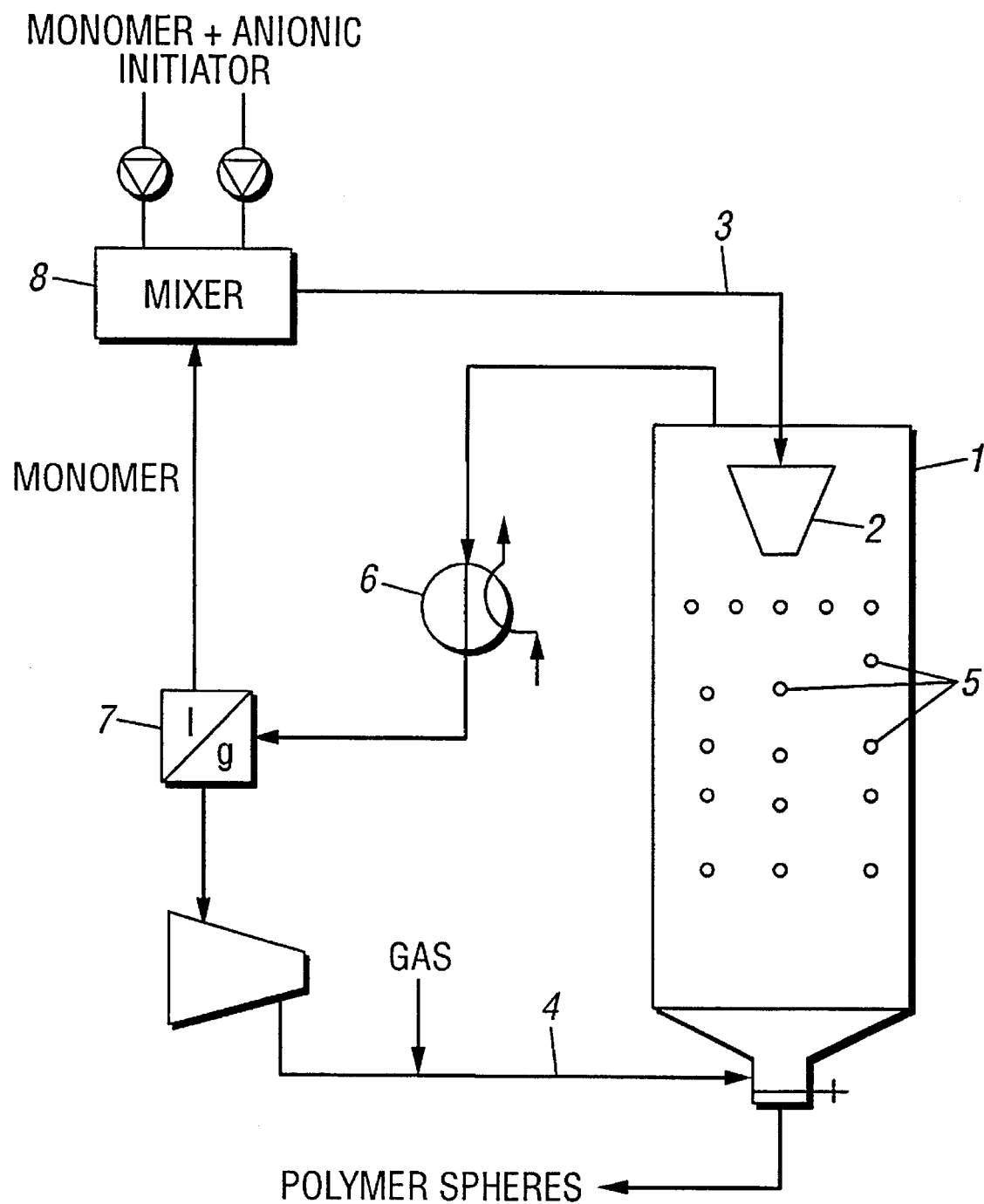
FIG. 1 shows a scheme of a counter current cooled spray-tower reactor.

The inventors surprisingly arrived at the present process whereby styrene polymers of sufficient molecular weight can be prepared by anion-initiated bulk polymerization in a spray-tower without risk of detrimental run-away reactions and thus without requiring the presence of a quench liquid in the lower portion of the spray-tower.

The selection of initiator species, i.e., anionic initiator, is fairly crucial for proper operation of the present invention as the other initiators (radical, cationic, etc.) are too slow or not thorough enough to yield the desired styrene polymer. The anionic initiator is conveniently admixed with the monomer feedstock prior to the same being sprayed into the spray-tower. Accordingly, the anionic initiator is preferably soluble in the monomer feedstock.

Suitable initiators are selected from alkyllithium, aryllithium, and, to a lesser extent (being less soluble and less reactive), from alkylsodium, arylsodium (for instance sodium naphthalene), alkylpotassium, arylpotassium or similar compounds known in the art. Very suitable anionic initiators are n-butyllithium and sec-butyllithium, the first for its stability, the latter for being more basic and hence more reactive. Sec-butyllithium is the preferred initiator. Other initiators that may be used advantageously are so-called capped initiators, i.e., initiators that are dormant below their activation temperature (K. Yagi et al, Journal of polymer science, vol. 14, 1976, pp. 1097–1105), but upon dissociation above that temperature turn into initiators that are as effective as regular initiators. Use of capped initiators, such as lithiumdiethylamide capped by pyridine, alleviates the cooling requirement at the prepolymerization stage discussed in detail herein after.

The selected anionic initiators, when used to prepare styrene polymers in accordance with the invention, will provide high initiation and propagation rates. The advantage thereof is twofold: (1) the time to complete the polymerization reaction is short, allowing for the production of high molecular weight polymers within the available time, and (2) the reaction proceeds essentially to completeness. The residual monomer content is thus very low, in particular as the present anionic polymerization reaction is devoid of termination reactions (provided the monomer feedstock is sufficiently pure).

To avoid premature polymerization, the anionic initiator is preferably admixed with the monomer feedstock just prior to being sprayed into the spray-tower. Nonetheless, it is also within the scope of the present invention to admix the anionic initiator and the monomer feedstock well before being sprayed into the reactor. In that case, the admixture should preferably be cooled sufficiently to essentially inhibit polymerization. If necessary, the admixture of monomer feedstock and anionic initiator may be brought to polymerization initiation temperature just prior to or upon spraying into the spray-tower. For the preferred embodiment, wherein a homopolymer is made of styrene using sec-butyl lithium as anionic initiator, that temperature suitably is about 0° C., and heating occurs inside the spray-tower.

To achieve high molecular weight styrene polymers, the anionic initiator is preferably employed in an amount relative to the monomer feedstock that is in the range of 0.1 to 30 mmole/mole. To produce styrene polymers having a number average molecular weight of about 150,000 to 300,000 the amount is preferably in the range of 0.2 to 1.0 mmole/mole.

It is within the scope of the invention to enhance the polymerization rate and/or protect the living polymer chains against termination by die-out through the addition of small amounts of polar solvents such as THF or other ethers. In particular, use of crownethers may be beneficial (F. Cook et al, ACS paper Org. Coat. Plast. Chem., vol. 44, 1981, pp. 139–144).

The monomer feedstock is selected from styrene; from styrene-like monomers; from mixtures of styrene with styrene-like monomers; from mixtures of styrene with anionically copolymerizable comonomers; from mixtures of styrene-like monomers with anionically copolymerizable comonomers; or from mixtures of styrene with styrene-like monomers and anionically copolymerizable comonomers. The mole/mole ratio of styrene and/or styrene-like monomers versus the anionically copolymerizable comonomers may vary broadly depending on the kind of polymer that is desired. A suitable mole/mole ratio is at least 1, preferably at least 10. Most preferably, the monomer feedstock is solely composed of styrene (i.e., the preferred embodiment mentioned above).

The styrene-like monomers are suitably selected from vinylarenes (vinylnaphthalene, etc.) and vinyl-substituted or aryl-substituted vinylarenes (e.g., para-phenylstyrene, vinyltoluene, alpha-methylstyrene, divinylbenzene, etc.). The anionically copolymerizable comonomers are suitably selected from vinyl monomers having electron-withdrawing substituents (such as cyano or ester groups, etc.) or having groups providing resonance stabilization (especially butadiene, 2-methyl-1,3-butadiene or 1,3-pentadiene). Naturally, the person skilled in the art will select the initiator, the composition of the monomer feedstock and the polymerization conditions (pressure and temperature) in such a manner that the respective initiation and propagation rates of the individual monomers allow for the polymerization to run smoothly and completely.

The choice of pressure in the spray-tower used as reactor depends amongst others on the selection of the monomer feedstock. In one embodiment, the total monomer feedstock is in liquid form. In another embodiment, the spray-tower is pressurized to the level whereby part of the monomer feedstock is in vapor form. To minimize the risk of incomplete conversion, resulting in a too high residual monomer content, elevated pressures are preferred. As the pressure controls the residence time of the droplet by turbulent drag, elevated pressures further provide longer residence time, higher convective heat- and mass transfer coefficients and higher reaction rates. On the other hand, having part (of the most volatile comonomer) of the monomer feedstock in vapor form, provides opportunities for evaporative cooling (and thus for changing the temperature of the droplet where the exothermic reaction takes place) as well as for varying the properties of the copolymer. Although this latter embodiment may require a degassing step, due to the pulverulent or bead-like form (higher available polymer surface area), degassing at or above its glass transition temperature of the so-produced styrene polymer will be less difficult than degassing polymers in an extruder as carried out in for instance the continuous mass polymerization process. Foaming, which may occur when the pressure in the spray-tower is too low, resulting in too vigorous evaporation, should preferably be avoided.

In the preparation of the homopolymer of styrene (i.e., polystyrene), the pressure is suitably in the range of 1 to 50 bar g, typically about 40 bar g. Styrene-like monomers usually have a higher boiling point, therefore generally requiring a similar pressure range. On the other hand, some of the comonomers mentioned above are more volatile and hence require higher pressures. Optimal conditions will be easily found by routine optimization test-runs.

The spray-tower is preferably pressurized with an essentially inert gas. The person skilled in the art may select from a wide range of inert gasses, although nitrogen is preferred for being the least expensive.

In an alternative embodiment, the spray-tower is pressurized with an inert, evaporated hydrocarbon and/or similar polymer solvent. This hydrocarbon and/or polymer solvent need not be removed, but is rather retained in the polymer particle to allow subsequent expansion of the particle when heated. The process therefore appears eminently suitable for preparing expandable polystyrene beads, in particular since it provides far better control of both the average particle bead size and the particle bead size distribution.

Preferably the inert gas is introduced in counter current flow to the monomer feedstock, thereby prolonging the free-fall of the polymerizing droplets of monomer feedstock. In relatively high spray-towers the time of free-fall is already sufficient to ensure full conversion of the monomer feedstock upon reaching the bottom of the spray-tower (approximately 10 seconds). In such spray-towers, the inert gas may be introduced at any level of the spray-tower, i.e., in counter current flow (upward), in co-current flow (downward) or in a more complex manner of flow.

The temperature inside the spray-tower need not be elevated, but should rather be able to cool the polymerizing, free-falling droplets sufficiently to solidify the same upon reaching the bottom of the spray-tower. In case of the preferred embodiment (polystyrene), the exit temperature of the droplets should therefore not exceed 100° C. This is achieved, for instance, by introducing the gas stream in the bottom part of the spray-tower, flowing counter currently upwards, which gas stream is introduced at a temperature in the range of 20° to 100° C., typically about 25° C.

In the spray-tower, the nozzle and the size of the orifices of the nozzle should preferably be designed to create droplets of very uniform size, that are large enough to enable direct polymer processing of the resulting polymer spheres (typically 0.5 to 3 mm diameter) without being too large. Droplets that are too large will otherwise shatter by shear forces and also have a shorter residence time (risking incomplete conversion and higher terminal velocity). Droplets that are too small risk falling in a non-ballistic manner. Through collision with other droplets a variety of particle size polymer particles may result, having complex molecular weight distributions. A nozzle suitably used is that known by the skilled man as the cooled rotating bucket.

In a further embodiment of the invention, the monomer feedstock comprises prepolymers, such as for instance high molecular weight polystyrene produced by thermal polymerization. Addition of such prepolymers provides control of the viscosity of the monomer feedstock and consequently additional control of the size of the droplets of polymerizing monomer feedstock formed in the spray-tower. Moreover, plasticity of the polymer particle (relevant for, e.g., EPS-like purposes) may so be differentiated.

To ensure sufficient residence time to allow the monomer feedstock to fully convert into the styrene polymer, the spray-tower preferably has an internal height in the range of 2 to 50 m. An internal height shorter than 5 m will require the inert gas-stream to be introduced at very high velocities, making the process more difficult to control. Spray-towers having an internal height larger than 50 m are very expensive, whereas the expense is not compensated by any advantage.

DESCRIPTION OF PREFERRED EMBODIMENTS

The process of the invention and the spray-tower suitably applied is illustrated by the following example of the anionic preparation of polystyrene particles that will have an average particle diameter of 2 mm, a number average molecular weight of approximately 100,000 and a residual styrene content of less than 500 ppm. A scheme of a counter current cooled spray-tower reactor is given in the FIG. 1.

A cooled admixture 3 (0° C.) of monomer feedstock (styrene) and anionic initiator (sec-butyl lithium 1.0 mmole/mole based on the styrene) is sprayed by a cooled rotating bucket 2 from the top of the spray-tower 1 (effective height of 20 m) into the reaction compartment with a counter current pressurized gas-stream 4 of nitrogen/styrene gas (at 0.1 m/s, 20 bar g, and 40° C.). The big droplets 5 are quickly heated up by monomer condensation from the rising hot gas-stream and convective heating. The exothermic reaction is thereby initiated. The temperature is determined by convective and evaporative cooling, stripping the condensed monomer from the droplet. The droplet is converted to solid styrene polymer before it reaches the bottom of the spray-tower 1. The gas stream flowing upwards and exiting the spray-tower at the top is cooled down in a heat exchanger 6, whereupon the vaporized styrene is separated from the nitrogen in an ordinary condenser 7. The cooled gas is recycled to the bottom of the spray-tower 1. The liquid from the condenser 7 is monomer which is sent to a mixer 8 which mixes the recycled monomer, fresh monomer, and anionic initiator.

We claim:

1. A process for preparing polymers, comprising the step of bulk polymerizing in a spray-tower reactor, in the presence of an anionic initiator, and in the absence of a quenching solvent, a monomer feedstock comprising one or more monomers selected from the group consisting of styrene, vinylarene compounds, vinyl-substituted vinylarene compounds, and aryl-substituted vinylarene compounds.

2. The process of claim 1, wherein the anionic initiator is selected from the group consisting of alkyl lithium, aryl lithium, alkyl sodium, aryl sodium, alkyl potassium, aryl potassium, and mixtures thereof.

3. The process of claim 2, wherein the anionic initiator is employed in an amount relative to the monomer feedstock in the range of 0.1 to 30 mmole/mole.

4. The process of claim 1, wherein the monomer feedstock is styrene.

5. A process for preparing copolymers, comprising the step of anionically copolymerizing in a spray-tower reactor, in the presence of an anionic initiator, a first monomer feedstock comprising one or more monomers selected from the group consisting of styrene, vinylarene compounds, vinyl-substituted vinylarene compounds, and aryl-substituted vinylarene compounds, with a second monomer feedstock comprising one or more vinyl monomers having electron withdrawing substituents or having groups providing resonance stabilization.

6. The process of claim 5, wherein the first monomer feedstock comprises styrene.

7. The process of claim 1, wherein the spray-tower is pressurized in the range of 1 to 50 bar.

8. The process of claim 7, wherein the spray-tower is pressurized with nitrogen gas.

9. The process of claim 7, wherein the spray-tower is pressurized with an inert, evaporated hydrocarbon or polymer solvent.

10. The process of claim 8, wherein the gas is passed through the spray-tower reactor in a direction counter current to the monomer feedstock.

11. The process of claim 10, wherein the gas stream is introduced into a bottom section of the spray-tower at a temperature in the range of 20° to 100° C.

12. The process of claim 7, wherein the spray-tower has an internal height in the range of from 5 to 50 m.

13. A process for preparing polymers, comprising the steps of:

mixing styrene and an anionic initiator in a mixer to form a monomer feedstock; and bulk polymerizing the monomer feedstock in a spray-tower reactor in the absence of a quenching solvent.

14. The process of claim 13, wherein the anionic initiator is selected from the group consisting of alkyl lithium, aryl lithium, alkyl sodium, aryl sodium, alkyl potassium, aryl potassium, and mixtures thereof.

15. The process of claim 14, wherein the anionic initiator is employed in an amount relative to the monomer feedstock in the range of 0.1 to 30 mmole/mole.

16. The process of claim 13, wherein the spray-tower is pressurized by introducing nitrogen into a bottom section of the spray-tower at a temperature in the range of 20° to 100° C.

17. A process for preparing polymers, comprising the steps of:

mixing styrene, butadiene and an anionic initiator in a mixer to form a monomer feedstock; and anionically copolymerizing the monomer feedstock in a spray-tower reactor in the absence of a quenching solvent.

* * * * *